United States Patent [19]

Kurumida

[11] Patent Number: 5,469,513
[45] Date of Patent: Nov. 21, 1995

[54] METHOD AND APPARATUS FOR GENERATING PATTERN

[75] Inventor: Tsuneaki Kurumida, Kawasaki, Japan

[73] Assignee: Canon Kabushiki Kaisha, Tokyo, Japan

[21] Appl. No.: 299,882

[22] Filed: Sep. 1, 1994

Related U.S. Application Data

[63] Continuation of Ser. No. 959,471, Oct. 9, 1992, abandoned, which is a continuation of Ser. No. 666,030, Mar. 7, 1991, abandoned.

[30] Foreign Application Priority Data

Mar. 9, 1990 [JP] Japan .................................. 2-58762

[51] Int. Cl.$^6$ .................................................. G06K 9/46
[52] U.S. Cl. ........................... 382/203; 382/199; 382/201; 395/141
[58] Field of Search ..................... 382/44, 47, 55, 382/21–23, 25; 358/451; 345/131, 135; 395/150, 86, 141–143

[56] References Cited

U.S. PATENT DOCUMENTS

| | | | |
|---|---|---|---|
| 4,620,287 | 10/1986 | Yam | 340/728 |
| 4,748,443 | 5/1988 | Uehara et al. | 382/55 |
| 4,771,474 | 9/1988 | Takashima et al. | 382/25 |
| 4,943,935 | 7/1990 | Sato | 340/728 |
| 5,042,075 | 8/1991 | Sato | 382/47 |

FOREIGN PATENT DOCUMENTS

| | | | |
|---|---|---|---|
| 215664 | 3/1987 | European Pat. Off. . | |
| 357383 | 3/1990 | European Pat. Off. | G06K 15/02 |
| 87/04835 | 8/1987 | WIPO | G09G 1/44 |

Primary Examiner—Yon J. Couso
Attorney, Agent, or Firm—Fitzpatrick, Cella, Harper & Scinto

[57] ABSTRACT

A character pattern generating apparatus for generating a bit map data from outline data corresponding to a pattern having a curve portion comprises: a discriminating circuit to discriminate a size of pattern data to be output; and a deciding circuit to decide whether the bit map data is generated or not by regarding the curve portion as a straight line from the outline data on the basis of the discrimination of the discriminating circuit. The curve portion is a portion to form a Bezier curve on the basis of the outline data.

15 Claims, 11 Drawing Sheets

| ATTRIBUTES | X-COORDINATES | Y-COORDINATES |
|---|---|---|
| 01 | 0 | 0 |
| 01 | 100 | 230 |
| 02 | 120 | 250 |
| 04 | 150 | 400 |
| 08 | 150 | 320 |
| 01 | 120 | 100 |
| 01 | 50 | 60 |

FIG.4A

FIG.4B $X = t^3 X0 + 3t^2(1-t)X1 + 3t(1-t)^2 X2 + (1-t)^3 X3$
$Y = t^3 Y0 + 3t^2(1-t)Y1 + 3t(1-t)^2 Y2 + (1-t)^3 Y3$
WHERE t VARIES CONTINUOUSLY FROM 0 TO 1

REDUCE INTO
HEIGHT OF
6 PIXELS

REDUCE INTO
HEIGHT OF
4 PIXELS

WHERE t VARIES CONTINUOUSLY FROM 0 TO 1

REDUCE INTO HEIGHT OF 6 PIXELS

FIG.9B

REDUCE INTO HEIGHT OF 6 PIXELS

FIG.10

METHOD AND APPARATUS FOR GENERATING PATTERN

This application is a continuation of application Ser. No. 07/959,471, filed Oct. 9, 1992, now abandoned, which was a continuation of application Ser. No. 07/666,030, filed Mar. 7, 1991, now abandoned.

BACKGROUND OF THE INVENTION

1. Field of the Invention

The present invention relates to pattern generating method and apparatus for generating a character pattern of a bit map font from outline font data corresponding to a pattern having a curve portion.

2. Related Background Art

Hitherto, a character pattern generating apparatus for generating a character pattern of a bit map font from an outline font having a curve portion comprises means for calculating a straight line, means for calculating a curve, and means for designating a character size.

However, in the above conventional apparatus, a straight line is calculated as a straight line and a curve is calculated as a curve irrespective of a character size and a bit map font pattern is generated, so that there are the following drawbacks.

(1) When a small character is generated, the curve portion of a character easily becomes fat and a painted portion is generated.

(2) Since a calculation of a curve is executed even in the case of a small character, it takes a time for the calculation and it is difficult to raise a generating speed of a character pattern.

As a method of suppressing the drawback of the above item (1), there is also a case of using a method whereby such a painted portion is prevented by adding additional information. However, if the above method is used, there are the following drawbacks.

(3) The calculation becomes complicated and a generating speed of a character pattern becomes slow.

(4) Since information is added, a data amount increases.

SUMMARY OF THE INVENTION

It is an object of the invention to provide pattern generating method and apparatus, in which either one of a mode to generate a curve from curve data and a mode to generate a straight line can be selected in accordance with a size of pattern, a painted portion of a character can be prevented without adding information to character data, and a pattern generating speed can be improved.

DETAILED DESCRIPTION OF THE PREFERRED EMBODIMENT

An embodiment of the present invention will be described hereinbelow with reference to the drawings, The invention is not limited to the above embodiment but can be installed to a printer such as laser beam printer, thermal ink jet printer, or the like or can be also installed to an apparatus such as word processor, typewriter, or the like.

Figure 1:
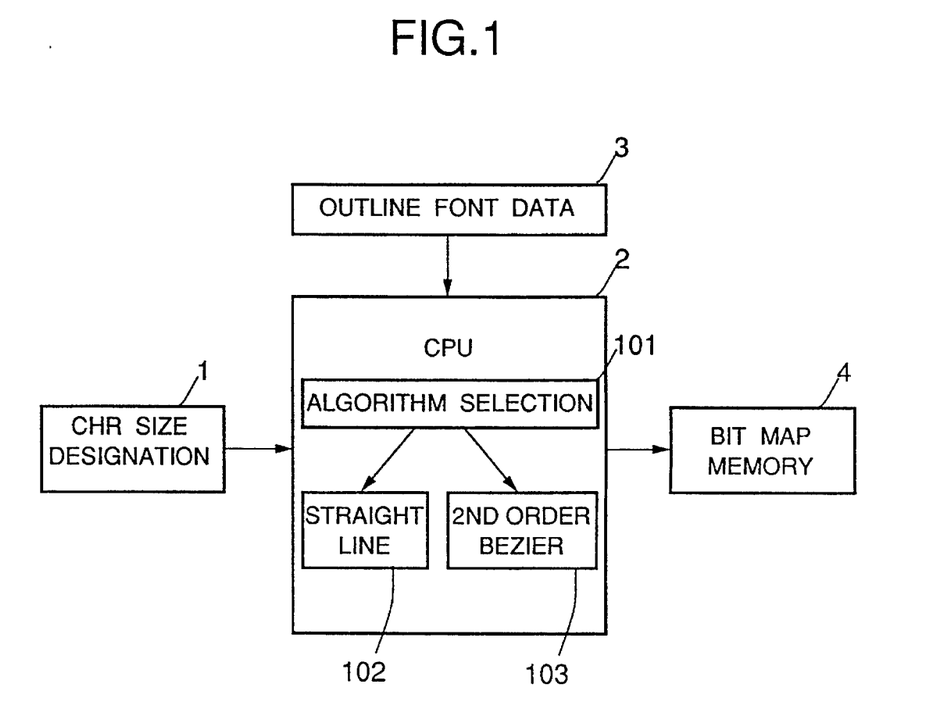
FIG. 1 is a diagram showing a character pattern generating apparatus to which the invention was embodied.

FIG. 1 is a diagram showing further practically a feature of the invention. In the diagram, reference numeral 1 denotes means for designating a size of character; 2 a CPU including therein an area to store a program; 3 outline font data comprising a straight line and a second order Bezier curve; and 4 a bit map memory. The CPU 2 writes the generated bit map data into the bit map memory 4. Reference numeral 101 denotes an algorithm selection means for selecting either a mode to use a straight line calculating means 102 or a mode to use second order Bezier curve calculating means 103. Reference numeral 102 denotes the straight line calculating means for developing a portion to be calculated by a straight line in outline font data by a calculation of a straight line. Reference numeral 103 denotes the second order Bezier curve calculating means for calculating a portion to be calculated by an inscription type curve such as a second order Bezier curve in the outline font data by a calculating equation of the second order Bezier.

Figure 2:
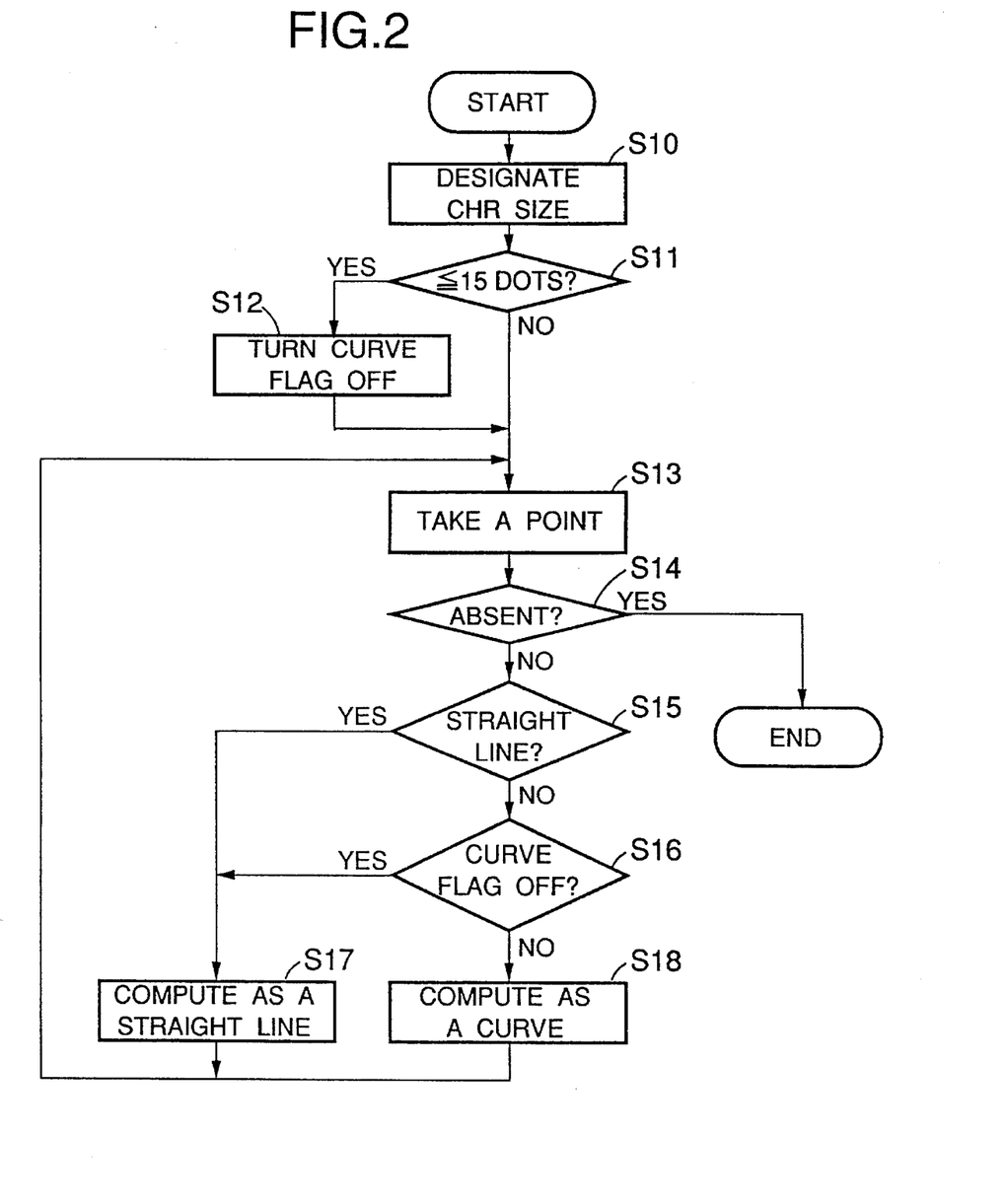
FIG. 2 is a flowchart for processes of the invention.
Figure 3:
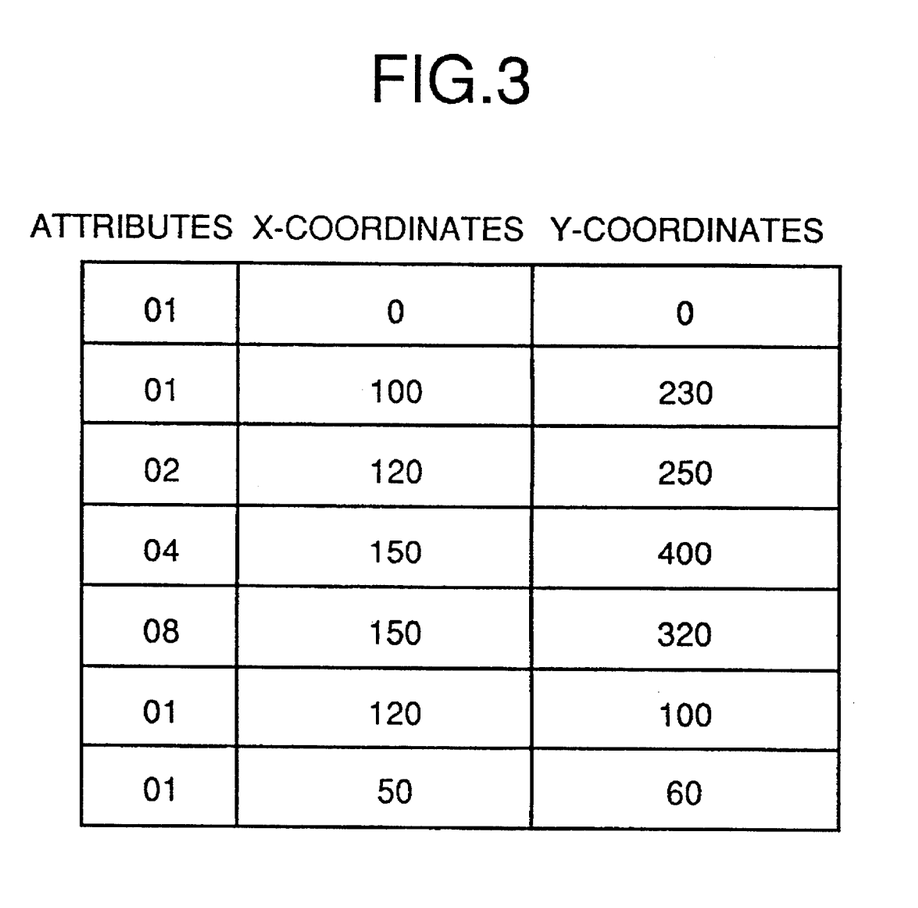
FIG. 3 is a diagram showing an example of an outline font which is used in the embodiment of the invention.

A processing procedure of the invention will now be described with reference to a flowchart of FIG. 2. First, in step S10, a size of character which will be generated from now on is designated. In step S11, a check is made to see if the size of character is equal to or less than a threshold value or not. In this case, the threshold value is set to 15 dots (for instance, a height of character assumes 15 dots) but can be also changed in accordance with a style of type, a kind of character, or the like. For instance, the threshold values for an European character and a Chinese character obviously differ and the threshold value for an European character is smaller than that of a Chinese character. If the character size is determined to be equal to or less than 15 dots in step S11, step S12 follows. In step S12, a curve flag is turned off. In step S13, coordinates of a point to be processed from now on (outline font data 3) are taken. A coordinate point indicative of an outline has attributes of either one of an initial point of a straight line or a curve, an intermediate point of a curve, and a terminal point thereof as shown in FIG. 3. In step S14, a check is made to see if such a point exists or not. If such a point is absent, the processing routine is finished. In step S15, a check is made to see if the above point is a point indicative of a straight line or not. If it indicates a straight line, a process in step S17 of a straight line is executed. In step S16, a check is made to see if a curve flag is ON or OFF. If it is OFF, a process is executed as a straight line irrespective of the attributes of the point. In step S17, a value is calculated as a straight line and outline information is generated. In step S18, a value is calculated as a second order Bezier curve and outline information is generated. Although not shown here, there are various methods of painting the inside of an outline. The area in a character is painted on the basis of the outline information. A Bezier curve, a second order Bezier curve, or the like can be used as such a curve.

FIG. 3 shows the relations between the coordinates of points and the attributes.

Those data are stored in the outline font data 3 in FIG. 1. As will be obviously understood from the diagram the attribute data is stored in correspondence to the X and Y coordinates. The attribute data 01 indicates a straight line, 02 denotes an initial point of a curve, 04 an intermediate point of a curve, and 08 a terminal point of a curve.

Figure 4A:
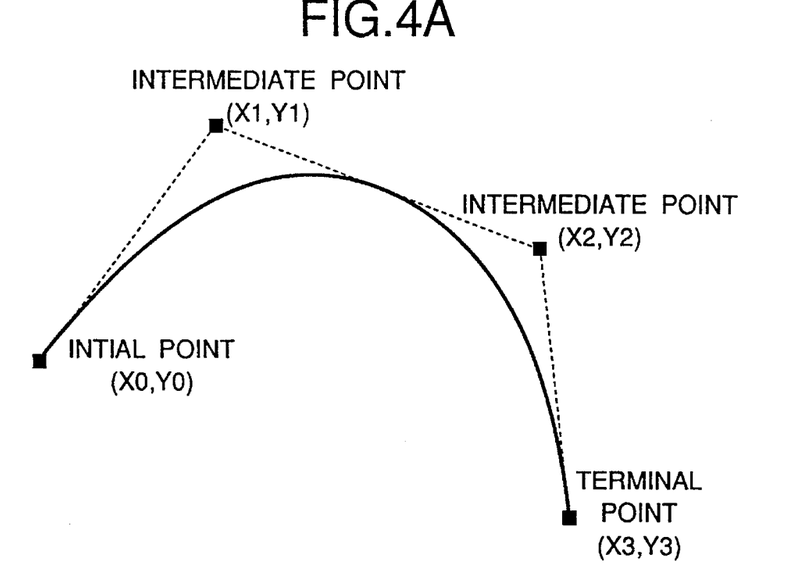
FIGS. 4A and 4B are diagrams showing a Bezier curve and a general equation.
Figure 4B:
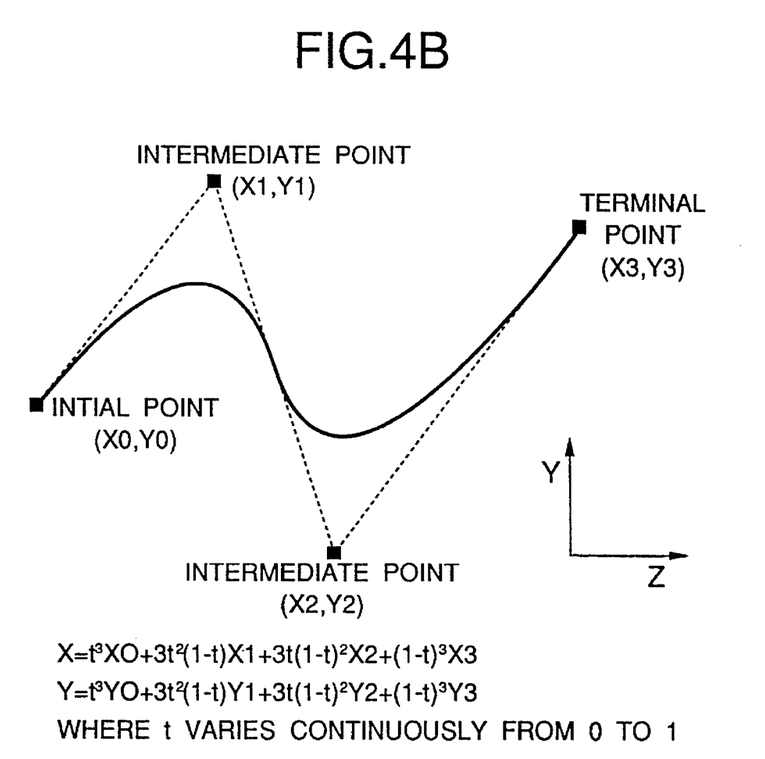

FIGS. 4A and 4B show Bezier curves and the relations among the initial point, intermediate point, and terminal point of curves by diagrams and equations. A solid line shows the Bezier curve having a feature such that the curve is drawn on the inside of the line (broken line in FIG. 4) which is formed by connecting the initial point, intermediate point, and terminal point by straight lines. Thus, the convex figure which is formed by using the Bezier curve is slightly smaller than the outline which is formed by connecting all of the points by straight lines.

Figure 5:
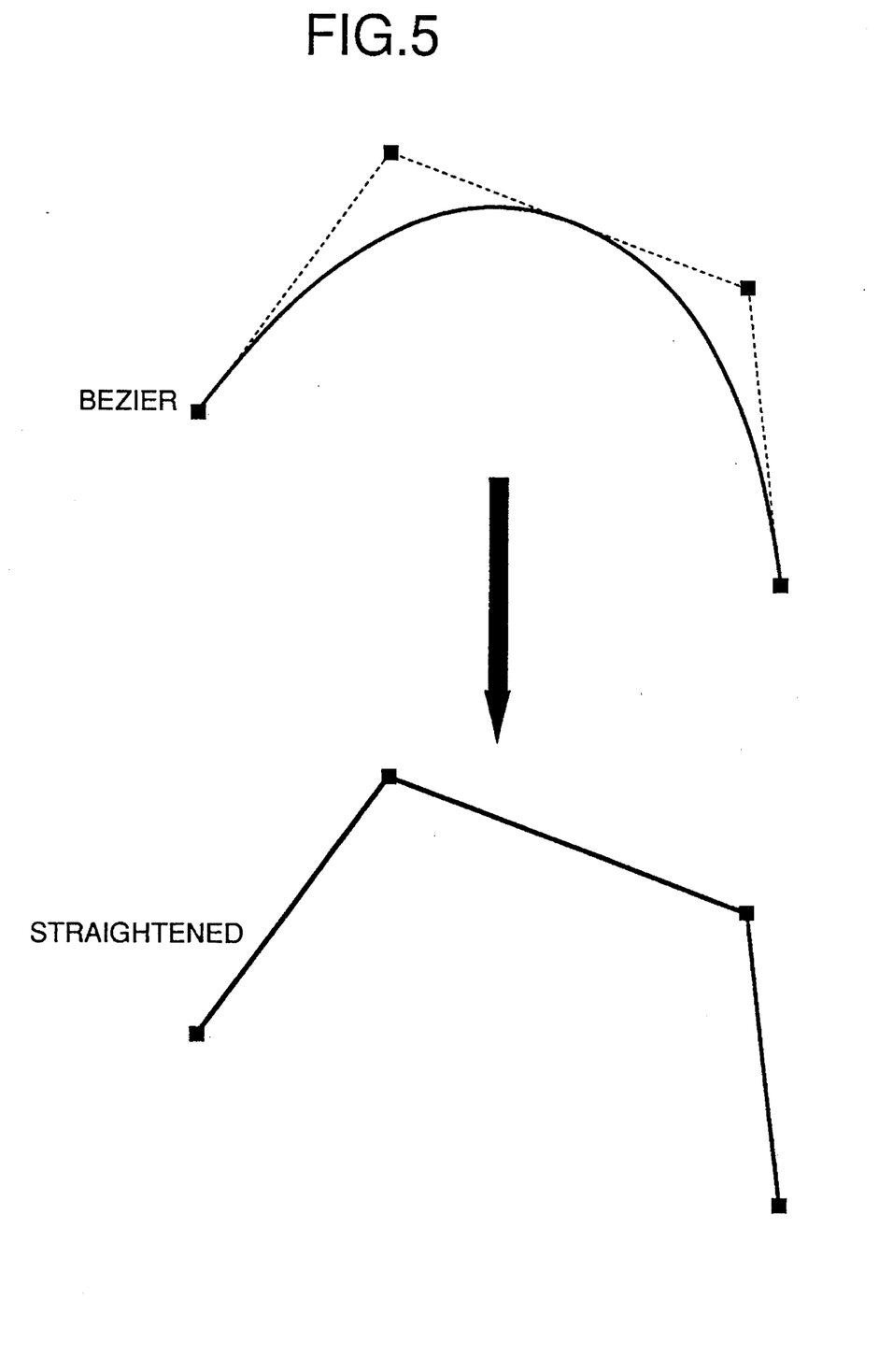
FIG. 5 is a diagram briefly showing processes according to the second example.

FIG. 5 is a diagram showing the case where a curve is formed from the data of one Bezier curve and the case where straight lines are formed.

Figure 6A:
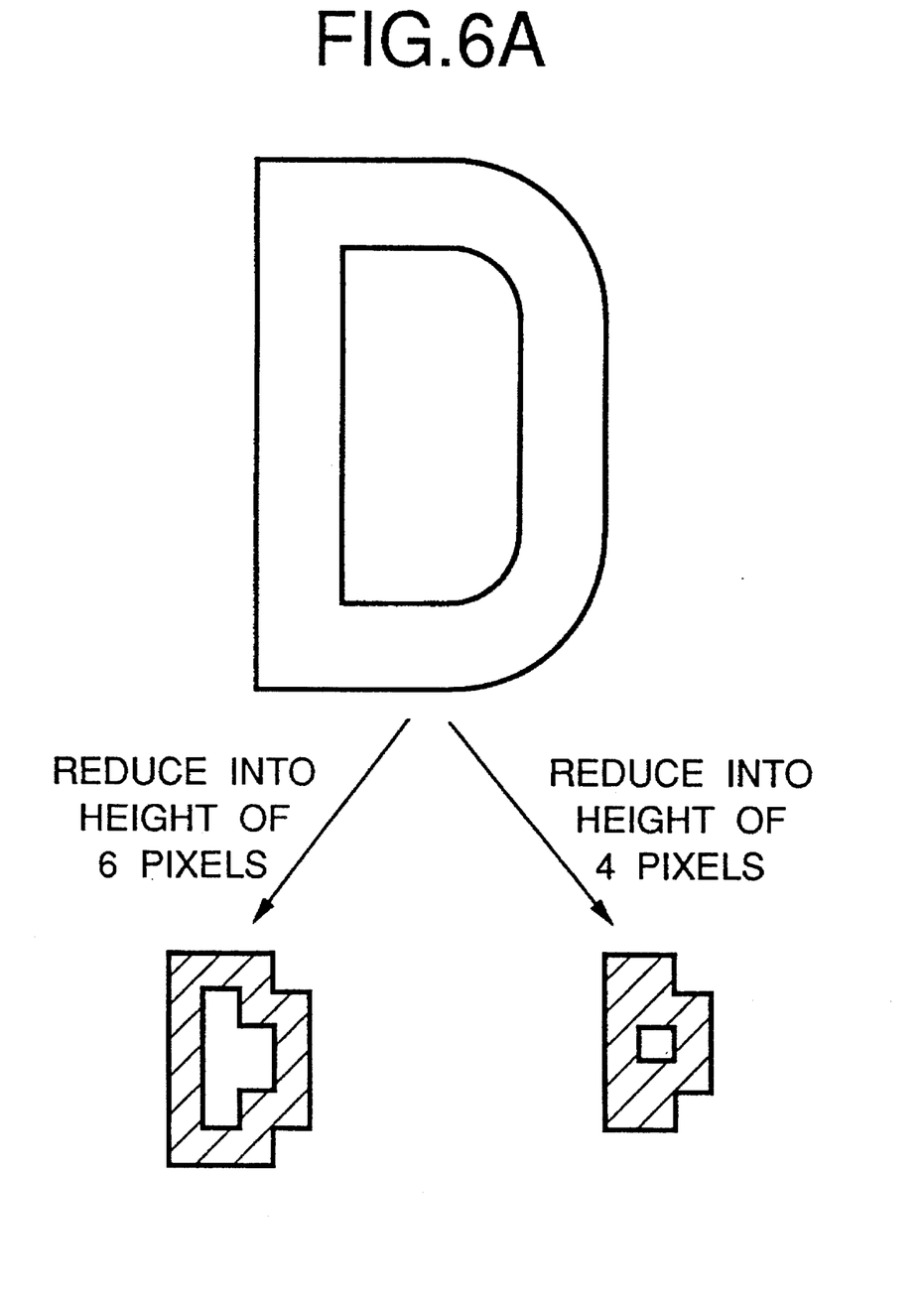
FIGS. 6A and 6B are diagrams showing an example of application of the invention in the case of a character "D"
Figure 6B:
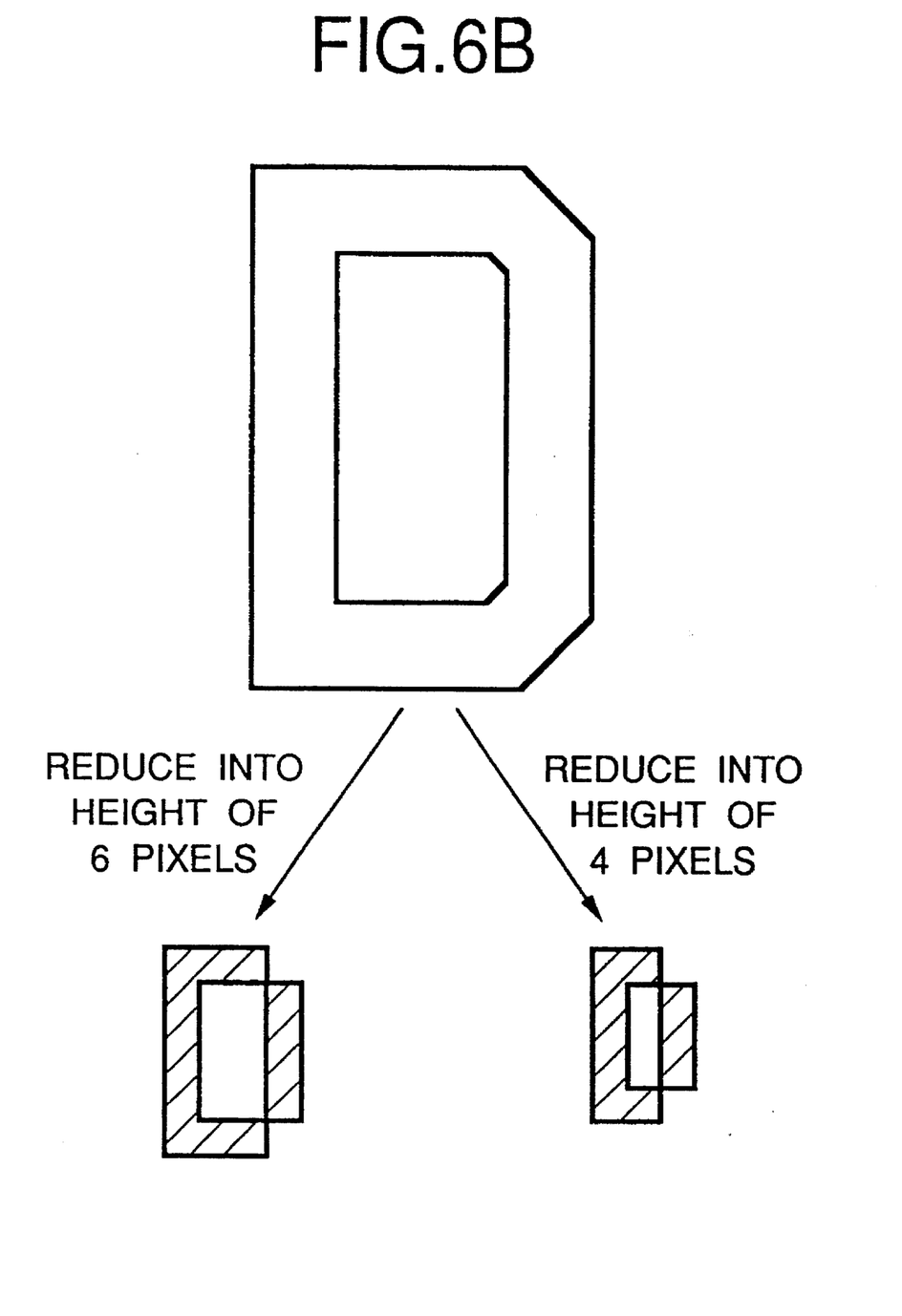

Examples of comparison of characters which are generated according to the invention will now be described with reference to FIGS. 6A and 6B. FIG. 6A shows the case where a Bezier curve is generated and reduced characters are formed. FIG. 6B shows the case where Bezier curve data is processed as a straight line and reduced character patterns are formed.

Figure 7:
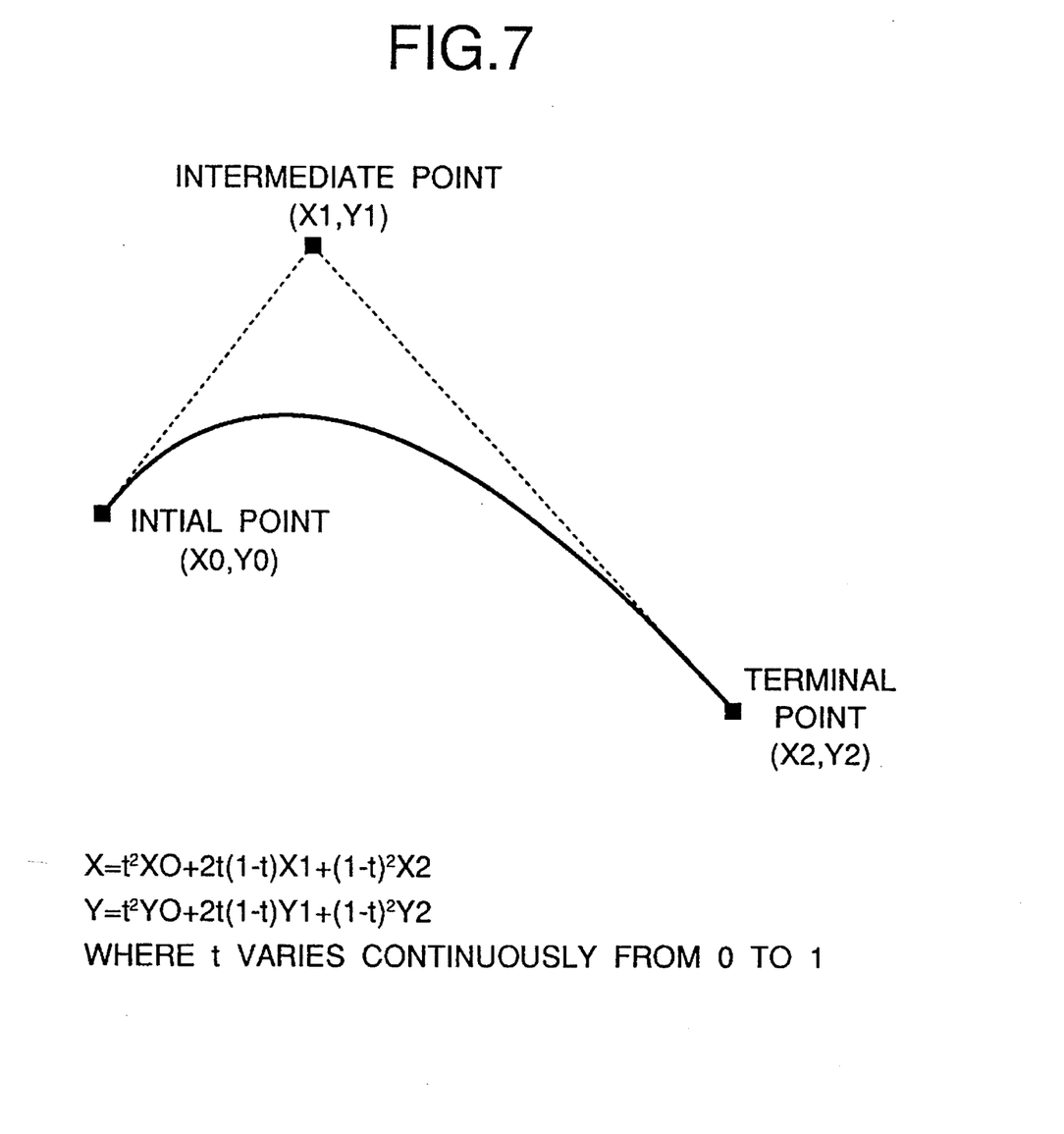
FIG. 7 is a diagram showing a second order Bezier curve and a general equation.

FIG. 7 shows a second order Bezier curve and the relations among the initial point, intermediate point, and terminal point of the curve by using a diagram and equations. A solid line shows a second order Bezier curve having a feature such that the curve is drawn on the inside of the line (broken line in FIG. 7) which is formed by connecting the initial point, intermediate point, and terminal point by straight lines. Therefore, the convex figure which is formed by using the second order Bezier curve is slightly smaller than the outline which is formed by connecting all of the points by straight lines.

Figure 8:
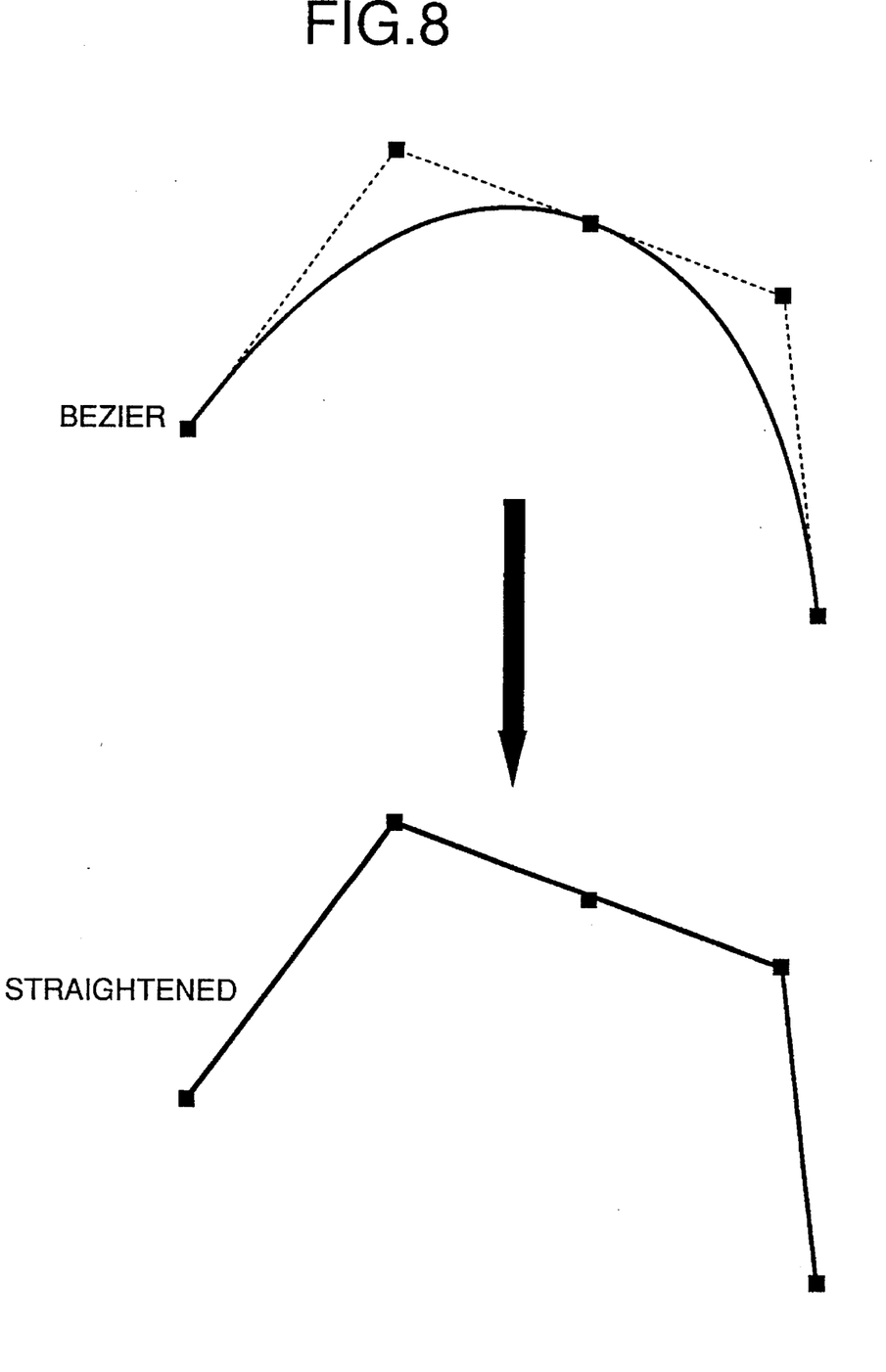
FIG. 8 is a diagram briefly showing processes in the second example.

FIG. 8 shows the case where one second order Bezier curve not subjected to the process of the character pattern generating apparatus according to the invention (second order Bezier curve itself) and the case where such a process was performed (straightened).

Figure 9A:
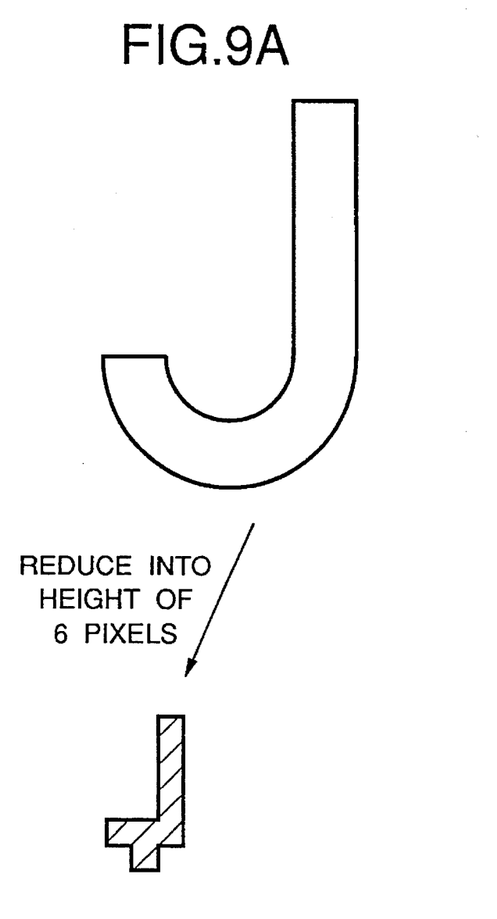
FIGS. 9A and 9B are diagrams showing an example of application of the invention in the case of a character "J"
Figure 9B:
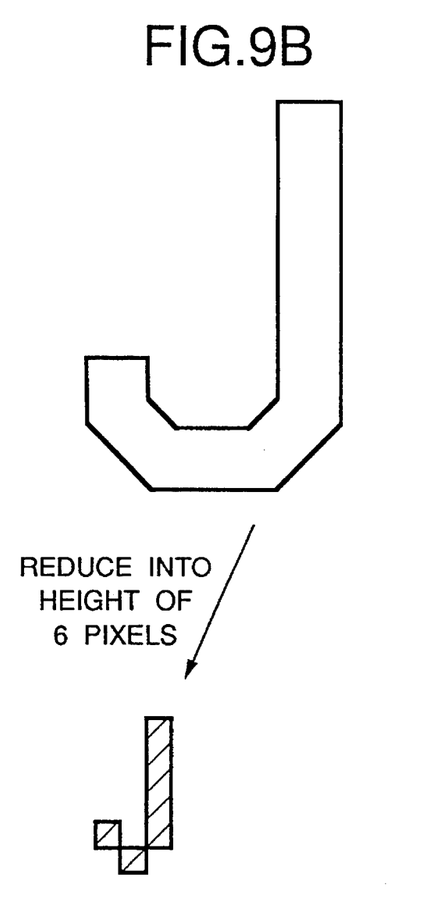

Examples of the characters which are generated according to the invention are shown in FIGS. 9A and 9B as a comparison. FIG. 9A shows the case of the conventional pattern generation in which a character is processed as a curve and is reduced. FIG. 9B shows the case of the character pattern generation according to the invention in which a character is processed as a straight line and reduced.

As mentioned above, by processing a second order Bezier curve as a straight line by a small character, the following effects can be obtained.

(1) When a small character is generated, it is possible to prevent that the Character is painted.

(2) An area of character increases and a degree of readability rises.

(3) Since the process of a curve is replaced by a straight line, a generating speed of the character is improved.

As described above, by replacing a curve by a straight line upon generation of a small character, a quality of character can be raised without adding new information to the character data and a character generating speed can be improved. The straightening process of the curve portion in the invention can be executed to the whole pattern to be generated or a part of the pattern.

For instance, the process to regard the curve portion as a straight line according to the invention can be also executed to only a curve interval which is shorter than a predetermined amount in the curve portion constructing one pattern.

Figure 10:
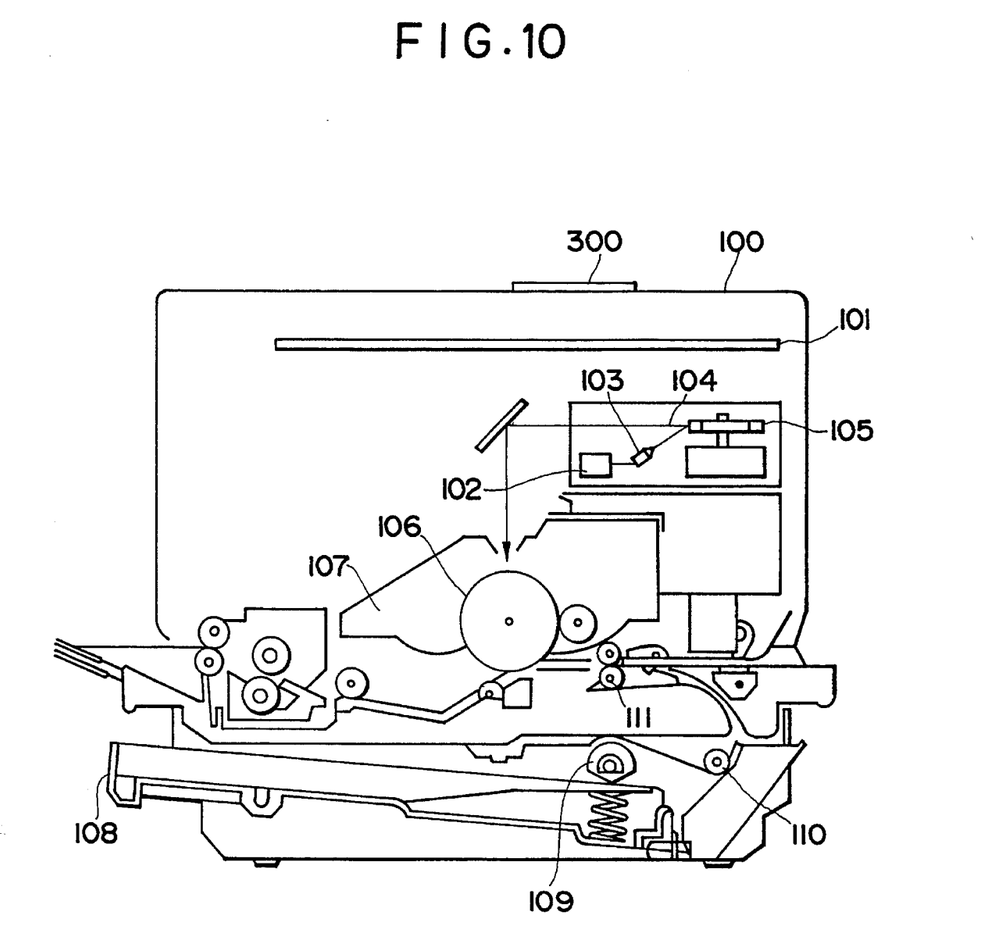
FIG. 10 is a sectional view showing the internal composition of a laser beam printer of the embodiment of the present invention.

First, FIG. 10 is a sectional view to show the internal composition of a laser beam printer of the embodiment of the present invention as an example of an output generating apparatus to which the pattern generating method and apparatus of the invention can be applied (hereinafter, the laser beam printer is referred to as an LBP). The LBP shown in the diagram can register a character pattern or form a pattern by feeding data from a data source (not shown). In the diagram, reference numeral 100 denotes a main body of the LBP which forms an image onto a sheet as a recording medium after character data (character code) or the like supplied by a host computer 201 connected to the outside was converted into a corresponding character pattern, a form pattern, or the like. Reference numeral 300 denotes an operating panel on which a switch for operation, an LED indicator, and the like are arranged. Reference numeral 101 denotes a printer control unit which executes control of the entire LBP 100 and analyzes the character data or the like supplied by the host computer. The printer control unit 101 converts mainly the character data into the video signals of the corresponding character pattern and outputs to a laser driver 102.

The laser driver 102 is a circuit to execute drive control of a semiconductor laser 103 and turns ON or OFF a laser beam 104 emitted from the semiconductor laser 103 in accordance with an input video signal. The laser beam 104 is irradiated onto an electrostatic drum 106 by being swung to the right and left by a rotary polygon mirror 105 and a latent image of the character pattern is formed on the electrostatic drum 106. This latent image is developed by a developing unit 107 arranged around the electrostatic drum 106 and is transferred to the sheet. A cut sheet is used as a sheet. The cut sheets are enclosed in a sheet cassette 108 set in the LBP 100. The sheets are picked up one by one and supplied into the LBP main body by a feed roller 109 and carrying rollers 110 and 111 and are fed to the electrostatic drum 106.

I claim:

1. A character pattern generating apparatus for generating bit map data from outline data, the outline data corresponding to a pattern having a curve portion and a straight portion, the outline data for the curve portion including a plurality of curve-generating control points which include an initial point, a terminal point and an intermediate point, said apparatus comprising:

discriminating means for discriminating output size of the bit map data; and generating means for generating bit map data for the pattern in accordance with said plurality of control points in the outline data, said generating means being responsive to output size discrimination of said discriminating means by generating straight line bit map data for the curve portion of the pattern using straight-line connection of each of said plurality of control points.

2. An apparatus according to claim 1, wherein the curve portion is a portion to form a Bezier curve on the basis of the outline data.

3. An apparatus according to claim 1, wherein in the case where said discriminating means discriminates that said output size is smaller than a predetermined size, said generating means generates straight line bit map data from said outline data.

4. An apparatus according to claim 1, wherein the straight line bit map data is generated for a part of the curve portion of the pattern.

5. An apparatus according to claim 1, further comprising a dot pattern printer for printing the bit map data generated by said generating means.

6. A pattern generating method for generating bit map data from outline data, the outline data corresponding to a pattern having a curve portion and a straight portion, the outline data for the curve portion including a plurality of curve-generating control points which include an initial point, a terminal point and an intermediate point, said method comprising the steps of:

discriminating output size of the bit map data; and generating bit map data for the pattern in accordance with said plurality of control points in the outline data, wherein in response to output size discrimination in said discriminating step straight line bit map data is generated for the curve portion of the pattern using straight line connection of each of said plurality of control points.

7. A method according to claim 6, wherein in the case where the discriminating step discriminates that the output size is smaller than a predetermined size, said generating step generates straight line bit map data from the outline data.

8. A method according to claim 6, wherein the straight line bit map data is generated for a part of the curve portion of the pattern.

9. A method according to claim 6, further comprising the step of printing the bit map data generated in said generating step on a dot pattern printer.

10. An apparatus according to claim 1, wherein said discriminating means discriminates output size on the basis of the number of dots constructing the size of pattern data to be output.

11. An apparatus according to claim 5, wherein said dot pattern printer is a laser beam printer or an ink jet printer.

12. An apparatus according to claim 5, further comprising word processing apparatus in accordance with which the outline data is provided.

13. A method according to claim 6, wherein in said discriminating step output size is discriminated on the basis of the number of dots constructing the size of pattern data to be output.

14. A method according to claim 9, wherein said dot pattern printer is a laser beam printer or an ink jet printer.

15. A method according to claim 9, further comprising the step of providing outline data from a word processing apparatus.

* * * * *

UNITED STATES PATENT AND TRADEMARK OFFICE
CERTIFICATE OF CORRECTION

PATENT NO. : 5,469,513
DATED : November 21, 1995
INVENTOR(S) : Tsuneaki Kurumida It is certified that error appears in the above-indentified patent and that said Letters Patent is hereby corrected as shown below:

<u>COLUMN 6</u>:

Line 17, "an" should read --a thermal--; and
Line 26, "an" should read --a thermal--.

Signed and Sealed this

Seventh Day of May, 1996

Attest:

BRUCE LEHMAN

Attesting Officer    Commissioner of Patents and Trademarks